United States Patent [19]

Klooster, Jr.

[11] 4,275,454
[45] Jun. 23, 1981

[54] OPTICAL SYSTEM PHASE ERROR COMPENSATOR

[75] Inventor: Alex Klooster, Jr., Ann Arbor, Mich.

[73] Assignee: Environmental Research Institute of Michigan, Ann Arbor, Mich.

[21] Appl. No.: 965,277

[22] Filed: Dec. 1, 1978

[51] Int. Cl.³ .................. G06G 9/00; G02B 27/22; G03H 1/16
[52] U.S. Cl. ................... 364/861; 350/3.6; 350/162 SF; 364/822; 365/216
[58] Field of Search ............ 364/827, 837, 822, 861, 364/713; 365/125, 216; 350/162 SF, 3.60, 3.66, 3.68, 3.70, 3.78, 3.83, 3.84

[56] References Cited

U.S. PATENT DOCUMENTS

| | | | |
|---|---|---|---|
| 3,398,269 | 8/1968 | Williams | 364/822 |
| 3,449,577 | 6/1969 | Kogelnik | 350/3.68 X |
| 3,484,147 | 12/1969 | Collier | 350/3.83 X |
| 3,519,331 | 7/1970 | Cutrona et al. | 364/822 |
| 3,530,442 | 9/1970 | Collier et al. | 350/3.78 X |
| 3,601,466 | 8/1971 | Tsuruta et al. | 350/3.83 X |
| 3,664,721 | 5/1972 | Roberts | 350/3.78 |
| 3,664,723 | 5/1972 | Toth et al. | 350/3.84 |
| 3,674,331 | 7/1972 | Caulfield | 350/3.78 |
| 3,748,048 | 7/1973 | Upatnieks et al. | 350/3.6 |
| 3,761,155 | 9/1973 | Lo et al. | 365/216 |
| 3,834,786 | 9/1974 | Carlsen | 350/162 SF |
| 3,891,975 | 6/1975 | Deml et al. | 365/216 |
| 3,936,139 | 2/1976 | Huignard et al. | 365/125 |
| 4,034,355 | 7/1977 | Carlsen | 365/216 |

OTHER PUBLICATIONS

Cutrona et al.: Filtering Operations using Coherent Optics Proceedings Nat. Electronics Conference, Chicago 1959, vol. XV, pp. 1–14.
Preston Jr.: Optical and Electro-Optical Information Processings M.I.T. Press, Chapter 4: Use of Fourier Transformable Properties pp. 59–68.
Amodei et al.: Improved Electrooptic Materials for Holographic Recordings, Applied Optics vol. 11, No. 2, Feb. 1972, pp. 390–396
Collier et al.: Optical Holography (Textbook) Academic Press 1971, pp. 372/373 Imaging through Phase-Distorting Media.

Primary Examiner—Felix D. Gruber
Attorney, Agent, or Firm—Krass, Young & Schivley

[57] ABSTRACT

A method for compensating for phase errors in an optical data processing system for performing a Fourier transformation analysis of a data source. The aberrations of the system are holographically recorded by passing an object beam through the system and the optical data source in a direction opposite to that of the DC read beam used in the transformation analysis. The object beam and a reference beam derived from a common coherent light source are generated by the system and directed to an optical memory wherein the interference pattern between the object and reference beam is recorded. The data source is analyzed by providing a read beam incident the optical memory along a path in the reverse direction of the reference beam. In such manner, a reconstruction beam emanating from the hologram is directed back through the data source to display the Fourier transform of the data in the data source. The reconstruction beam thus serves to automatically compensate for phase errors introduced into the system by thickness variations of the data source as well as from the lenses in the system.

12 Claims, 2 Drawing Figures

OPTICAL SYSTEM PHASE ERROR COMPENSATOR

BACKGROUND OF THE INVENTION

This invention relates to optical data processing systems. More particularly, it involves a data processing system in which the Fourier transform or spatial frequency function of an optical data source is optically derived.

Optical data processing systems which perform a Fourier transform analysis of an optical data source are well known in the art. See e.g., "Use of the Fourier Transformable Properties of Lenses for Signal Spectrum Analysis," by K. Preston, Jr., Chapter 4 of *Optical and Electro-optical Information Processing*, published by M.I.T. Press; and "Filtering Operations using Coherent Optics," by Cutrona et al, reprinted from Volume XV, *Proceedings of the National Electronics Conference*, Hotel Sherman, Chicago, Ill., Oct. 12–14, 1950. Typically, the data source includes a transparency having a developed image thereon of the data whose spatial frequency analysis is desired. In one application, the data source may include a transparency in which the inputs from a plurality of Very Large Array (VLA) radio telescopes are superimposed. In another application, the data source may be a picture of ocean waves where the wave frequency and direction are to be measured.

In any event, the spatial frequency function of the data source is supplied by optically deriving the Fourier transform of the data source. In the system, a source of coherent monochromatic light is collimated by a spherical lens and projected upon the data source which, as noted above, carries imprinted thereon a signal function consisting of density variations. The Fourier transform plane is disposed on the other side of the data source at the focal plane of a transform lens. The light passing through the data source will be diffracted by the density variations in the data source and will appear as spots at the Fourier transform plane. These spots will be spaced from the central DC beam depending upon the frequency of the input data. The DC beam, as it is commonly referred to, is representative of the zero frequency component of the data and can be envisioned as a line passing through the center of the light source, collimator lens, data source, transform lens, and Fourier transform plane. The higher frequency components of the input data are displaced proportionately from the DC beam at the Fourier transform plane according to their frequency, i.e., the higher frequency components being displaced further away from the DC beam.

Unfortunately, phase errors can be introduced into the system due to imperfections in the lenses, variations in the thickness of the data source transparency, etc. As is known in the art, such phase errors will disturb the accuracy of the optically derived Fourier transform. The use of precision components can minimize the phase error. However, the cost of such components may be prohibitive in many applications.

Therefore, this invention is directed broadly to compensating for phase errors in such optical data processing systems thereby permitting the use of components having less precision to reap the benefits of their inherently lower cost.

SUMMARY OF THE INVENTION

According to the broadest aspects of this invention, a hologram is formed from an object beam directed through the system in the reverse direction of the DC beam utilized in the normal optical Fourier transform analysis process. The object beam and a reference beam are derived from a coherent light source such as a laser and directed at a recording medium, such as a self developing electro-optic crystal, which records the interference pattern between the object beam incident the data source and the reference beam. In such manner, the hologram thus formed is a function of the phase errors in the optical data processing system. To perform the Fourier transformation, a read beam is provided incident the memory along a path in the reverse direction of the reference beam. The hologram in the memory provides a reconstruction beam which is directed back through the data source in the reverse direction from the object beam which originally formed the hologram. Accordingly, the hologram automatically compensates, via the reconstruction beam, for the phase errors in the system.

BRIEF DESCRIPTION OF THE DRAWINGS

These and other advantages of the present invention will become more apparent upon reading the following specification and by reference to the accompanying drawings in which.

DESCRIPTION OF THE PREFERRED EMBODIMENTS

Figure 1:
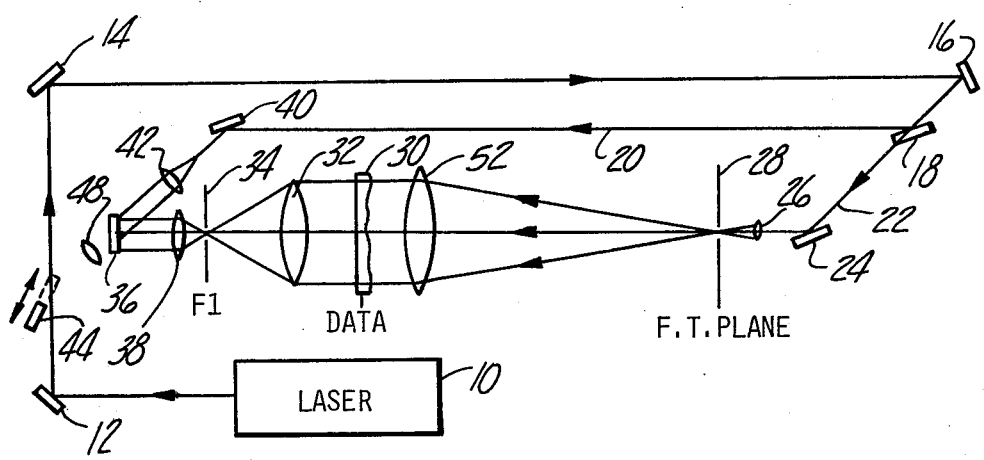
FIG. 1 is a schematic diagram of an optical data processing system which illustrates the light paths during the recording mode of the present invention.

With reference to FIG. 1, the present invention includes a source 10 of monochromatic coherent light which can be supplied, for example, by a well known laser. According to the method of this invention, the beam of light is reflected by mirrors 12, 14, and 16 to a beam splitter 18 of conventional design. The derived beams emanating from beam splitter 18 will be referred to as the reference beam 20 and object beam 22. The object beam 22 is reflected by mirror 24 along a path antiparallel or in the reverse direction from the DC beam utilized to perform the Fourier transformation as will be later discussed more fully herein. Object beam 22 passes through spherical lens 26 having a focal length which corresponds to the normal Fourier transform plane 28.

The Fourier transform lens 52 and data source 30 are disposed downstream from the Fourier transform plane 28. As noted above, data source 30 may be in the form of a strip of film which bears data thereon in the form of density variations. A variety of well known sources of such data is well known in the art and need not be further described. The object beam 22 passes through Fourier transform lens 52 and data source 30 and then is collected by converging lens 32 wherein the beam is brought to focus at spatial filter 34. Filter 34 is similarly of conventional design and typically employs a pinhole which passes only the low frequency components of the object beam incident data source 30. The thus filtered object beam is then directed towards holographic recording medium 36 by means of lens 38.

Recording medium 36 can be a variety of well known devices for permanently recording holograms. In the preferred embodiment, recording medium 36 is an electro-optical crystal of lithium niobate or barium sodium niobate. As disclosed in *Applied Optics*, February, 1972, page 390, by Amodei et al, such crystalline structures provide a permanent record or storage medium which is self-developing when light impinges on the crystalline structure. Alternatively, recording medium 36 may be a film which is later developed and replaced in its original position. As can be seen by reference to the drawing, recording medium 36 thus stores a hologram which is formed by the object beam 22 and the reference beam 20 which is reflected by mirror 40 to recording medium 36 through lens 42. As is known in the art, holograms are generated by the interference pattern between the light rays of an object and a reference beam. With application to the present invention, the hologram thus formed in recording medium 36 is a function of the phase errors in the data processing system. Particularly, these phase errors are caused by imperfections in lens 52, 32, and 38, which cause aberrations at certain frequencies. Similarly, data source 30 may be of a non-uniform thickness which also causes phase errors in the system. For purposes of this invention, the steps described so far shall be referred to as comprising the recording mode. It can be envisioned that in the recording mode, a "reverse", i.e., in a plane on the side of data source 30 opposite from the normal Fourier transformation plane used in the analysis mode, Fourier transformation is caused to be performed at the plane defined by spatial filter 34, with the pinhole in plane 28 providing a point source of coherent light which passes through data source 30. However, since spatial filter 34 only passes the low frequency component of the data which is affected by the phase errors in the system, the hologram on recording medium 36 will produce a reconstruction signal which is the conjugate of the system phase errors that will be encountered in the analysis mode which will now be described.

Before describing the analysis mode, it should be understood that the data source 30 need not necessarily be present in the system during the recording mode if the data source 30 includes such precision characteristics that it would not cause a substantial amount of phase errors in the system. In such case the spatial filter 34 would not be necessary. The majority of the informational data on data source 30 is of a relatively high spatial frequency as is known in the art. When the data source 30 is used in the recording mode, spatial filter 34 blocks the high spatial frequency signal containing the information and passes the low spatial frequency components derived from the phase errors created in data source 30. Thus, the hologram formed in recording medium 36 contains primarily only low spatial frequency phase information created by the object beam incident the data source and lenses of the system. Thus, in the analysis or read back mode, the phase information contained in the reconstruction beam will similarly be of a relatively low spatial frequency and will not affect the much higher spatial frequency informational data in data source 30 but only cancel out the low frequency phase errors created by it and the lenses.

Figure 2:
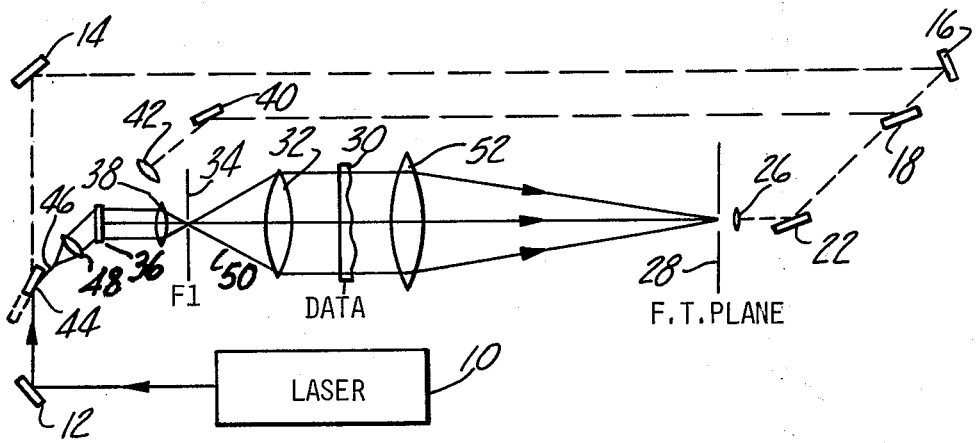
FIG. 2 is a schematic diagram of the system of FIG. 1 illustrating the light paths during the Fourier transform analysis mode.

In the analysis mode as shown in FIG. 2, a movable mirror 44 intercepts the beam from source 10 before it reaches beam splitter 18. Conveniently, mirror 44 can be attached to suitable linkages for moving it into the path of the beam. As is shown most clearly in FIG. 2, mirror 44 block the beam from reaching mirror 14 and reflects the beam along a path anti-parallel or in the reverse direction from reference beam 20 that was utilized in the recording mode. This beam will be referred to as read beam 46 for ease of description. The read beam 46 passes through collimator lens 48 to the hologram stored on recording medium 46. As is known in the holographic art, the read beam 46 is thus defracted by the hologram and provides a reconstruction beam 50 which is the conjugate of the object beam which created the hologram. Accordingly, when the reconstruction beam 50 passes back through the optical data processing system, the phase errors in the system are automatically cancelled out. With particular reference to the system described in the drawings, reconstruction beam 50 passes through lens 38 by which it is focused to provide a light source for the analysis mode. Lens 32 serves as a collimator which directs the light back through data source 30 and transform lens 52 in the reverse direction so that the Fourier transformation of the data in source 30 is displayed at Fourier transform plane 28.

Hence, it can now be realized that the present invention is broadly applicable to the general concept of recording the overall phase system error holographically and using that holographic record to generate a light distribution that serves as a compensated light source that cancels the effect of system phase errors. Accordingly, it should be realized that while this invention has been described in connection with particular examples thereof, no limitation is intended thereby except as defined in the appended claims.

The embodiments of the invention in which an exclusive property or privilege is claimed are defined as follows:

1. A method of compensating for phase errors in an optical data processing system having a plurality of lenses for displaying the Fourier transformation of optical data contained in a data source, said method comprising:

generating a reference and object beam from a coherent light source;

passing the object beam in a given direction through the lenses and data source of the data processing system;

using a low frequency spatial filter to pass only low frequency components of the object beam incident said data source;

directing the filtered object beam and reference beam to an optical memory;

storing the interference pattern between the object beam and the reference beam in the optical memory as a hologram whereby low spatial frequency phase errors of the system are recorded; and reading the data from the data source by providing a read beam incident said memory along a path in the reverse direction of the reference beam, with the hologram stored in the memory providing a reconstruction beam which passes back through the same lenses and through the data source opposite to said given direction to a plane at which the Fourier transformation of the data is displayed, thereby compensating for the phase errors in the system data source and lenses.

2. The method of claim 1 wherein said memory is a self-developing electro-optic crystal storage device.

3. The method of claim 2 wherein said memory is a lithium niobate crystal.

4. The method of claim 2 wherein said memory is a barium sodium niobate crystal.